United States Patent
Jiang et al.

(10) Patent No.: US 8,421,317 B2
(45) Date of Patent: Apr. 16, 2013

(54) END CAP ASSEMBLY

(75) Inventors: Zhi Qiang Jiang, Shenzhen (CN); Bin Liu, Shenzhen (CN); Zhao Jing Lao, Shenzhen (CN)

(73) Assignee: Johnson Electric S.A., Murten (CH)

( * ) Notice: Subject to any disclaimer, the term of this patent is extended or adjusted under 35 U.S.C. 154(b) by 119 days.

(21) Appl. No.: 12/912,263

(22) Filed: Oct. 26, 2010

(65) Prior Publication Data
US 2011/0095630 A1     Apr. 28, 2011

(30) Foreign Application Priority Data
Oct. 26, 2009   (CN) .......................... 2009 1 0110329

(51) Int. Cl.
*H02K 5/00* (2006.01)
*H02K 11/00* (2006.01)
*H02K 13/00* (2006.01)

(52) U.S. Cl.
USPC ................. 310/400; 310/71; 310/72; 310/89; 310/239

(58) Field of Classification Search .................... 310/89, 310/68 R, 239, 400–417, 40 MM, 68, 67 R, 310/247–253; *H02K 5/00, 13/00*
See application file for complete search history.

(56) References Cited

U.S. PATENT DOCUMENTS

| | | | | |
|---|---|---|---|---|
| 4,728,835 A | * | 3/1988 | Baines | 310/71 |
| 5,243,247 A | * | 9/1993 | Schmidt | 310/239 |
| 5,942,819 A | * | 8/1999 | Burgess et al. | 310/51 |
| 6,861,775 B2 | * | 3/2005 | Lau | 310/71 |
| 6,927,522 B2 | * | 8/2005 | Skofljanec | 310/239 |

FOREIGN PATENT DOCUMENTS
JP    55068862 A  *  5/1980

OTHER PUBLICATIONS
USPTO Translation, JP 55068862 A, Electric Part Mounting Device for Small-Sized Motor, May 23, 1980.*

* cited by examiner

*Primary Examiner* — Tran N. Nguyen
*Assistant Examiner* — Thomas Truong
(74) *Attorney, Agent, or Firm* — Muncy, Geissler, Olds & Lowe, PLLC

(57) ABSTRACT

An electric motor has an end cap assembly comprising: a base and a cover. The base has a first chamber configured to receive a commutator, a second chamber configured to receive electronic components, and brush boxes having passages configured to receive brushes. The first chamber and the second chamber are respectively formed on opposite sides of the base. The passages of the brush boxes open into the first chamber to allow the brushes to slidably contact a commutator disposed therein. The cover is fixed to the base and covers the second chamber.

11 Claims, 3 Drawing Sheets

END CAP ASSEMBLY

CROSS REFERENCE TO RELATED APPLICATIONS

This non-provisional patent application claims priority under 35 U.S.C. §119(a) from Patent Application No. 200910110329.2 filed in The People's Republic of China on Oct. 26, 2009.

FIELD OF THE INVENTION

This invention relates to an end cap assembly for an electric motor and in particular, to a an end cap assembly for a miniature high voltage direct current motor.

BACKGROUND OF THE INVENTION

In many applications an electric motor is required which has low EMI emissions. Usually this has been achieved by adding EMI/EMC suppression components such as chokes and capacitors into the motor circuitry which is usually mounted on an end cap within the motor. However, in a miniature electric motor, the end cap is small, for example, the diameter of the end cap may be less than 30 mm. Thus the end cap of a miniature electric motor may not have enough space to accommodate the required EMI/EMC suppression components. In a high voltage electric motor, for safety reasons, a distance, known as the creepage distance, must be kept between adjacent electrical components greater than a safe value to prevent flash over between the components. This requirement further limits the possibility of mounting EMI/EMC suppression components in the end cap of a miniature high voltage motor.

SUMMARY OF THE INVENTION

Hence there is a desire for an end cap assembly that can solve the above-mentioned problems or at least provide the public with a useful choice.

Accordingly, in one aspect thereof, the present invention provides an end cap assembly for an electric motor, comprising: a base made of insulating material, the base comprising a first chamber configured to receive a commutator, a second chamber configured to receive electronic components, and brush boxes having passages configured to receive brushes, the first chamber and the second chamber being respectively formed on opposite sides of the base and the passages of the brush boxes opening into the first chamber to allow the brushes to slidably contact a commutator disposed therein; and a cover attached to the base and covering the second chamber.

Preferably, the base comprises a hub, a sidewall spaced from and surrounding the hub, and a connecting wall connecting the hub with a first end of the sidewall remote from the cover, the first chamber being formed in the hub, the second chamber being formed between an outer surface of the hub, inner surface of the sidewall, the connecting wall, and the cover.

Preferably, two kinds of EMI/EMC suppression components are respectively mounted on two mounting surfaces in the second chamber, the two mounting surfaces being located at different levels in an axial direction of the base.

Preferably, the brush boxes extend radially outwardly from the hub, one of the mounting surfaces being formed on a side of the brush boxes, the sidewall, at a second end thereof, extending beyond said one of the mounting surfaces in a direction towards the cover.

Preferably, the EMI/EMC suppression components comprise a choke and a capacitor, the choke being mounted on said one of the mounting surfaces, the capacitor being mounted on a side of the connecting wall facing the cover.

Preferably, two motor terminals are provided for connecting to a power supply, wherein two lands are connected between the hub and the sidewall, each land having a slot, each of the terminals being inserted in a corresponding slot and extending through the cover.

Preferably, the cover has a central opening, and an axial end of the hub remote from the connecting wall extends through the central opening, the axial end of the hub having a through hole accommodating a shaft of the motor.

Preferably, at least one recess sunken radially is formed in an inner surface of the first chamber.

According to a second aspect, the present invention provides an electric motor incorporating an end cap assembly as described above.

Preferably, the electric motor is a miniature high voltage direct current motor.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
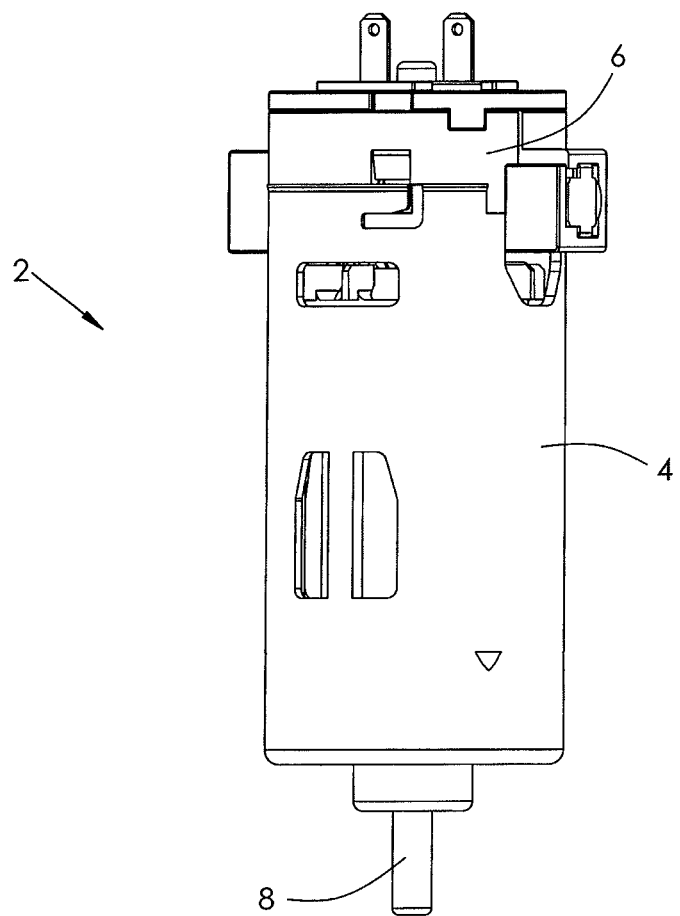
FIG. 1 shows an electric motor incorporating an end cap assembly in accordance with a preferred embodiment of the present invention.
Figure 2:
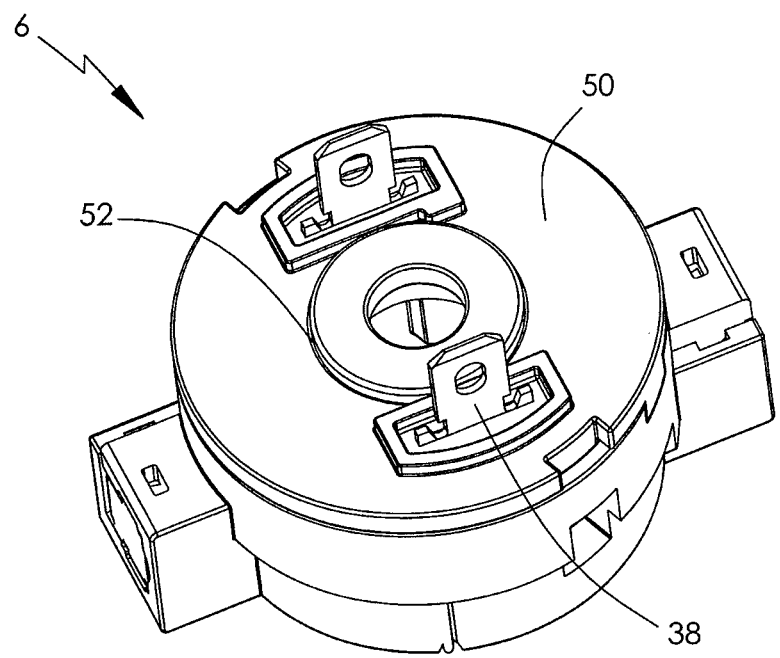
FIG. 2 is an assembled view of the end cap assembly.

FIG. 1 illustrates a miniature high voltage direct current electric motor 2 incorporating an end cap assembly 6 in accordance with the preferred embodiment of the present invention as shown in FIGS. 2 to 5. The motor 2 has a housing 4, preferable a deep drawn steel tube with a closed end and an open end. The end cap assembly 6 is fitted to the open end of the housing. The closed end of the housing and the end cap support bearings in which a shaft 8 of the motor is journalled.

Figure 3:
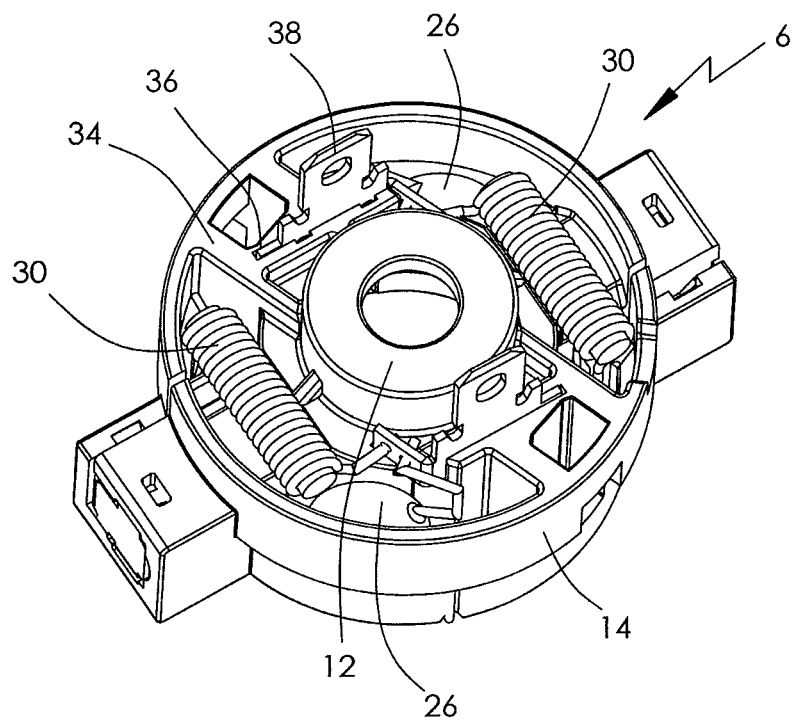
FIG. 3 illustrates a base of the end cap assembly showing EMI/EMC suppression components mounted thereon.
Figure 4:
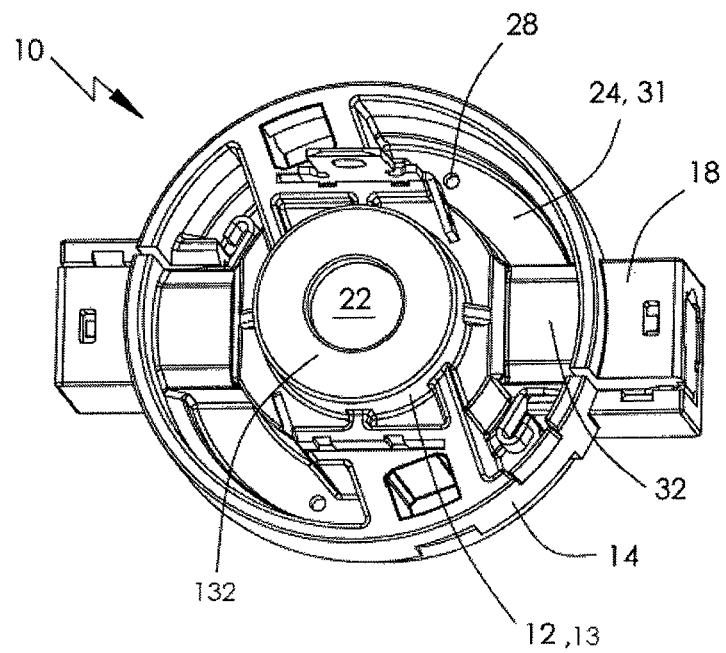
FIG. 4 is a view of the base of FIG. 3, without the suppression components.
Figure 5:
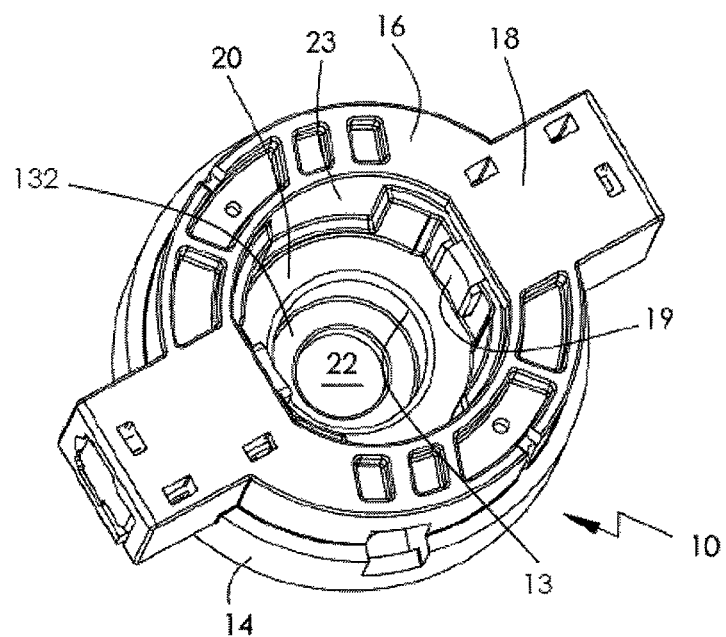
FIG. 5 illustrates the base of FIG. 4 viewed from below.

The preferred end cap assembly 6 according to the present invention is shown in more detail in FIGS. 2 to 5. The end cap assembly is shown assembled in FIG. 2 in an upright or vertical position, showing two motor terminals 38 and two brush boxes. The end cap has two parts, a base 14 and a cover 50. In FIG. 3 the end cap assembly is shown with the cover removed to show components within the base. FIG. 4 is a similar view to FIG. 3 but with most of the components removed to show the structure of the base. One motor terminal and connectors for the brushes are shown. FIG. 5 is a view of the underside of the base of FIG. 4, showing the structure of the underside or first side of the base and showing brushes 19 within the brush boxes, 18.

The base 10 and cover 50, are made of an insulating material, such as nylon, The base 10 comprises a hub 12 located at a center thereof, a cylindrical sidewall 14 radially spaced from and surrounding the hub 12, a connecting wall 16 extending radially and connecting the hub 12 to a first end of the sidewall 14 remote from the cover 50, and brush boxes 18 extending radially outwardly from the hub 12 and through the sidewall 14. The brush boxes each have a passage arranged to slidably receive a brush 19.

The hub 12 forms, at a first end thereof adjacent to the connecting wall 16, a round first chamber 20 configured to accommodate a commutator (not shown). The passages in the brush boxes open into the first chamber 20 and guide the brushes into contact with a brush contact surface of the commutator received in the first chamber. The other end of the hub 12, remote from the connecting wall 16, extends through a central opening 52 of the cover 50. A mounting hole 22 extends through the hub to allow the shaft of the motor to extend through the end cap. The hub 12 has a portion 13 of reduced diameter which forms a boss for mounting a bearing therein for supporting the shaft of the motor. The boss 13 extends more radially inwardly than inner ends of the brushes 19 and the boss 13 has a radially extending end wall 132 which surrounds the mounting hole 22. Parts of the inner surface of the chamber 20 are sunken radially and outwardly to form recesses 23 for receiving particles generated due to friction of the brushes 19 on the commutator. Recesses 23 are formed in the inner surface of the wall of the chamber 20 to receive dust particles formed by the wearing of the brushes and commutator.

The cover 50 is attached to the second side of the base 10 by crimping of the motor terminals. Small crimping fingers extend axially along side the terminals to be plastically deformed once the cover is fitted to secure the cover to the base. The second chamber 24 is defined by the outer surface of the hub 12, the inner surface of the sidewall 14, the connecting wall 16 and the cover 50. EMI/EMC suppression components such as capacitors 26 and chokes 30, are accommodated in the second chamber 24. The surface of the connecting wall 16 facing the cover 50 provides a first mounting surface 31 for mounting the capacitors 26 thereon. The connecting wall 16 has through holes 28 in the first mounting surface for one lead of the capacitors 26 to be fixed to the connecting wall 16. Each capacitor has one lead which is inserted through the hole 28 and then bent to lie along the connecting wall thus holding the capacitor in place. The lead is then laid through a small groove in the sidewall so that when the end cap is fitted to the open end of the housing, the lead is squeezed between the base and the housing to make electrical contact between the housing and the capacitor, thus grounding the capacitor.

The second axial end of the sidewall 14, remote from the connecting wall 16, extends beyond the brush boxes 18 in the axial direction of the base 10. The surfaces of the brush boxes 18 adjacent to the axial end of the sidewall 14 form a second mounting surface 32 for mounting the chokes 30 thereon. Thus, the capacitors 26 and chokes 30 are respectively mounted on the first and second mounting surfaces 31 and 32 which are located at different levels in the axial direction of the base 10, i.e. are axially spaced, allowing the capacitors 26 and chokes 30 to partly overlap in the axial direction. Two lands 34 are formed between the hub 12 and the sidewall 14. Each land 34 has a slot 36. A motor terminal 38 is inserted in each slot 36 and extends through the cover 50, for connecting to a power supply. Alternatively, the terminals 38 can be replaced by leads.

In the preferred embodiment, the brushes 19 slidably contact with the commutator in the first chamber 20 formed at one side of the base 10. EMI/EMC suppression components 26 and 30 are received in the second chamber 24 formed at the opposite side of the base 10. Thus, dust particles generated due to rubbing of the brushes 19 on the commutator in the first chamber 20 do not easily penetrate into the second chamber 24. The cover 50 substantially closing the open side of the second chamber 24, further blocks the dust particles escaping from the first chamber 20 from entering into the second chamber 24 to cause short circuits between the EMI/EMC suppression components 26 and 30. Furthermore, the components 26 and 30 are mounted on two mounting surfaces which are located at different levels in the axial direction of the base 10, which further increases the creepage distance between the components 26 and 30. The components 26 and 30 may partly overlap in the axial direction of the base 10 to thereby reduce the footprint or the total area the components 26 and 30 occupy in the plane perpendicular to the axial direction of the base 10. The end cap in accordance with the preferred embodiment of the present invention is especially suitable for a miniature high voltage electric motor. An end cap according to the present invention may also be used in a miniature low voltage electric motor.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. An end cap assembly for an electric motor, comprising:
a base made of insulating material, the base comprising a first chamber configured to receive a commutator, a second chamber configured to receive electronic components, and brush boxes having passages configured to receive brushes, the first chamber and the second chamber being respectively formed on opposite sides of the base and the passages of the brush boxes opening into the first chamber to allow the brushes to slidably contact the commutator disposed therein; and
a cover attached to the base and covering the second chamber;
wherein the base comprises a hub, a sidewall spaced from and surrounding the hub, and a connecting wall connecting the hub with a first end of the sidewall remote from the cover, the first chamber being formed in the hub, the second chamber being formed between an outer surface of the hub, inner surface of the sidewall, the connecting wall, and the cover.

2. The end cap assembly of claim 1, wherein two kinds of EMI/EMC suppression components are respectively mounted on two mounting surfaces in the second chamber, the two mounting surfaces being located at different levels in an axial direction of the base.

3. The end cap assembly of claim 2, wherein the brush boxes extend radially outwardly from the hub, one of the mounting surfaces being formed on a side of the brush boxes, the sidewall, at a second end thereof, extending beyond said one of the mounting surfaces in a direction towards the cover.

4. The end cap assembly of claim 3, wherein the EMI/EMC suppression components comprise a choke and a capacitor, the choke being mounted on said one of the mounting surfaces, the capacitor being mounted on a side of the connecting wall facing the cover.

5. The end cap assembly of claim 1, further comprising two motor terminals for connecting to a power supply, wherein two lands are connected between the hub and the sidewall, each land having a slot, each of the terminals being inserted in a corresponding slot and extending through the cover.

6. The end cap assembly of claim 1, wherein the cover has a central opening, and an axial end of the hub remote from the connecting wall extends through the central opening, the axial end of the hub having a through hole accommodating a shaft of the motor.

7. The end cap assembly of claim 1, wherein at least one recess sunken radially is formed in an inner surface of the first chamber.

8. An electric motor incorporating the end cap assembly of claim 1.

9. An end cap assembly for an electric motor, comprising:
a base made of insulating material, the base comprising a first chamber configured to receive a commutator, a second chamber configured to receive electronic components, and brush boxes having passages configured to receive brushes, the first chamber and the second chamber being respectively formed on opposite sides of the base and the passages of the brush boxes opening into the first chamber to allow the brushes to slidably contact the commutator disposed therein; and
a cover attached to the base and covering the second chamber from one of the sides of the base remote from the first chamber;
wherein the base comprise a hub with a portion extending radially and inwardly to separate the first chamber and the second chamber, the portion extending more inwardly than inner ends of the brushes, the first chamber being formed in the hub, the second chamber being formed between the base and the cover.

10. The end cap assembly of claim 9, wherein the components are mounted on two mounting surfaces which are located at different levels in an axial direction of the base.

11. The end cap assembly of claim 9, wherein the base further comprises two lands formed between the hub and the sidewall, each land having a slot, a conductor being inserted in each slot and extending through the cover, for connecting to a power supply.

* * * * *